United States Patent [19]
Chiaroni et al.

[11] Patent Number: 5,953,142
[45] Date of Patent: Sep. 14, 1999

[54] VARIABLE DELAY APPARATUS FOR OPTICAL SIGNALS

[75] Inventors: Dominique Chiaroni, Antony; Dominique De Bouard, Ste Genevieve des Bois; Michel Sotom, Paris, all of France

[73] Assignee: Alcatel, Paris, France

[21] Appl. No.: 08/941,673

[22] Filed: Sep. 30, 1997

[30] Foreign Application Priority Data

Oct. 7, 1996 [FR] France .................................. 96 12187

[51] Int. Cl.[6] .............................. H04J 14/08; H04J 14/02; G02F 1/35; G01J 1/04
[52] U.S. Cl. .......................... 359/127; 359/140; 359/127; 359/326; 250/227.12
[58] Field of Search .................................. 359/140, 127, 359/326, 227.12; 250/227.12

[56] References Cited

U.S. PATENT DOCUMENTS

| | | | |
|---|---|---|---|
| 5,264,960 | 11/1993 | Glance | 359/344 |
| 5,589,967 | 12/1996 | Auffret | 359/123 |
| 5,636,045 | 6/1997 | Okayama et al. | 359/140 |
| 5,703,708 | 12/1997 | Das et al. | 359/140 |
| 5,721,637 | 2/1998 | Simon et al. | 359/344 |

OTHER PUBLICATIONS

F. Masetti et al, "Fiber Delay Lines Optical Buffer for ATM Photonic Switching Applications", Networking Foundation for the Future, San Francisco, Mar. 28–Apr. 1, 1993, vol. 3, Mar. 28, 1993, Institute of Electrical and Electronics Engineers, pp. 935–942, XP000419653.

F. S. Choa et al, A WDM Implementation of Optically Transparent Photonic ATM Switches, Proceedings of the Lasers and Electro–Optics Society Annual Meeting, Boston, Oct. 31–Nov. 3, 1994, vol, 1, Oct. 31, 1994, Institute of Electrical 7 Electronics Engineers, pp. 232/233 XP000510763.

J. B. Jacob et al, "Very High Bit Rate Optical Switch for ATM Applications", Communication et Transmission, vol. 16, No. 2, Jan. 1, 1994, pp. 5–14, XP000450570.

Primary Examiner—Jason Chan
Assistant Examiner—Mohammad Sedighian
Attorney, Agent, or Firm—Sughrue, Mion, Zinn, Macpeak & Seas, PLLC

[57] ABSTRACT

In order to reduce its switching time, the delay apparatus comprises a coupler and a multiplexer provided with n inlets set respectively to n distinct wavelengths. Inlets of the multiplexer are coupled respectively to outlets of the coupler via wavelength conversion apparatuses, and via delay lines all of which are different. Each conversion apparatus has an amplifying optical gate function and delivers to the corresponding inlet of the multiplexer a wave carried by the wavelength associated with said inlet. The invention also concerns apparatus for synchronizing channels of a wavelength multiplex using the variable delay apparatus. Application in particular to synchronizing optical packets in a switched optical network.

5 Claims, 2 Drawing Sheets

VARIABLE DELAY APPARATUS FOR OPTICAL SIGNALS

The invention relates to the field of data transmission using optical links, and it relates more particularly to optical delay apparatus. Such apparatus is used in particular in "all-optical" switched networks to solve problems of packet synchronization with a view to managing contention in the switching systems.

BACKGROUND OF THE INVENTION

A first known type of delay apparatus consists in placing optical switches and calibrated delay lines in cascade and in alternation. The path travelled by a wave applied to the inlet of the apparatus is a function of the commands applied to the optical switches. Unfortunately, that system suffers from the drawback of imparting interference noise.

Another type of delay apparatus consists in placing a tunable wavelength converter, an optical demultiplexer, and an optical multiplexer in cascade, the outlets of the demultiplexer being coupled to the corresponding inlets of the multiplexer via delay lines all having different lengths. Thus, as a function of its wavelength, the wave delivered by the converter is directed to a single one of the delay lines.

That solution offers the advantage of being simple, but it is difficult to implement if very short switching times are desired. Moreover, means need to be provided for dynamically tuning the carrier of the converter.

OBJECTS AND SUMMARY OF THE INVENTION

An object of the invention is to remedy the above drawbacks. To this end, the invention provides apparatus for creating a variable delay between an output optical wave and an input optical wave, the waves being modulated between low and high power levels.

According to an exemplary embodiment, a coupler is provided with at least one inlet for receiving the input optical wave, and with n outlets for delivering portions of said input wave.

In addition, a multiplexer is provided with at least one outlet for delivering an output optical wave, and n inlets set respectively to n associated different wavelengths. The inlets of the multiplexer are coupled respectively to the outlets of the coupler via associated wavelength conversion apparatuses, and, for at least n−1 inlets of the multiplexer, via respective delay lines all of which are different.

Furthermore each conversion apparatus has an amplifying optical gate function for selectively delivering a converted wave modulated as a function of the input wave, and carried by a wavelength equal to that associated with the inlet.

By means of the presence of amplifying optical gates, i.e. optical amplifiers generally optimized for enabling gain to be varied rapidly as a function of an electrical command, switching can be very rapid, typically less than 300 picoseconds, unlike solutions using tunable wavelength converters. Furthermore, the carriers are stable because each converter transmits with a fixed wavelength. Furthermore, the gains of the amplifiers can be adjusted, which makes it possible to adjust the power of the output signal and to make it independent of the delay applied. Finally, the use of optical gates having a high isolation ratio and associated with a multiplexer guarantees spectral separation, which avoids creating interference noise.

According to another aspect of the invention, each wavelength conversion apparatus comprises a semiconductor optical amplifier coupled firstly to a respective one of said outlets of the coupler and secondly to a laser oscillator delivering a probe wave. The amplifier is organized to operate under saturated conditions when the input optical wave is at its high power level. In addition, the modulated converted wave is the probe wave as amplified by the amplifier.

In this aspect, the semiconductor optical amplifier acts both as an amplifying optical gate, and as a wavelength converter.

The invention also provides apparatus for synchronizing channels of a wavelength multiplex using the variable delay apparatus of the invention.

BRIEF DESCRIPTION OF THE DRAWINGS

Other aspects and advantages of the invention appear from the following description given with reference to the figures, in which.

MORE DETAILED DESCRIPTION

Figure 1:
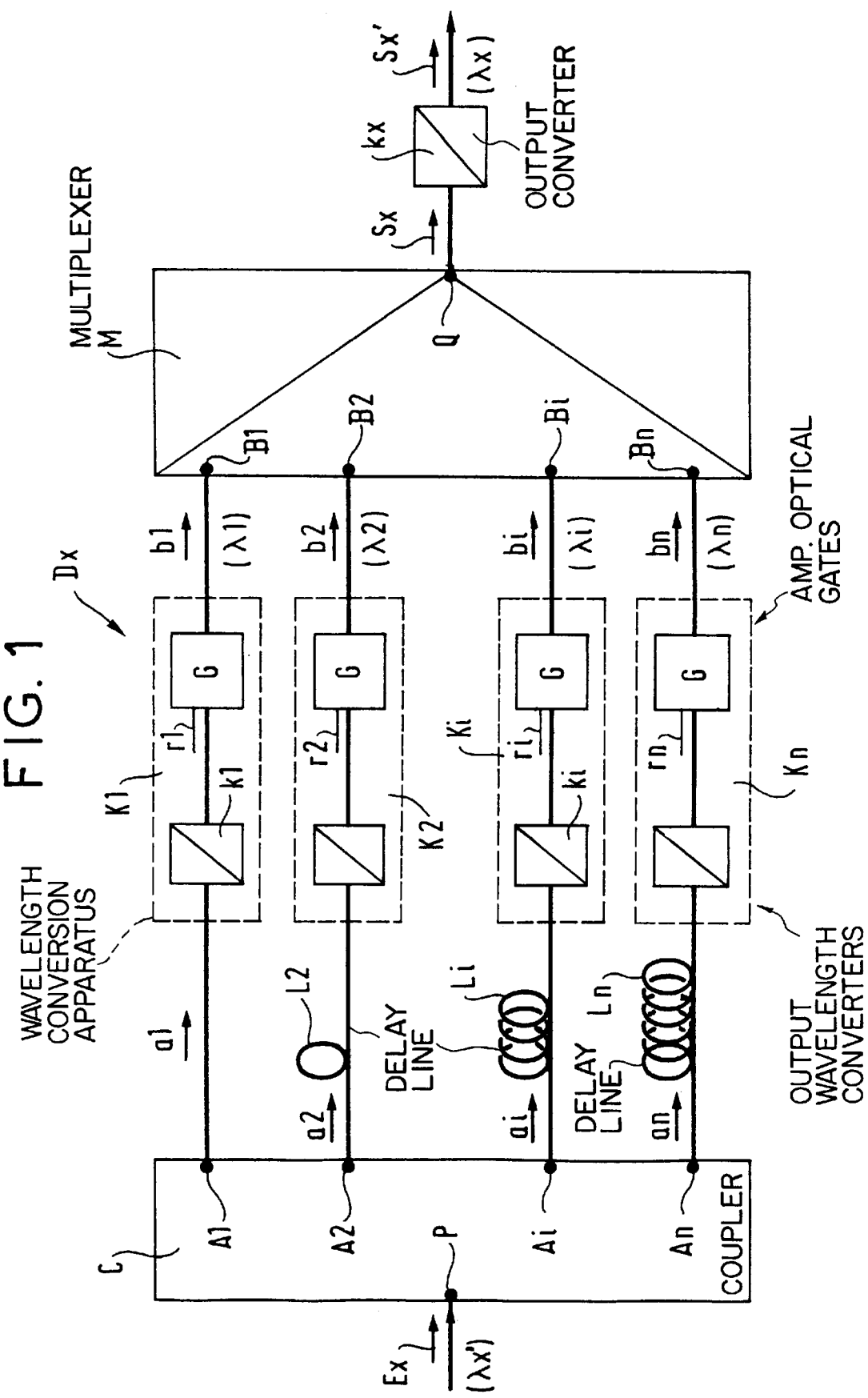
FIG. 1 shows delay apparatus of the invention.

The variable delay apparatus Dx shown in FIG. 1 includes a coupler C provided with an inlet P and n outlets A1, A2, Ai, An. The inlet P serves to receive an input optical signal Ex. This signal is in the form of a power-modulated carrier of wavelength $\lambda x'$. The first outlet A1 of the coupler C is connected to an inlet B1 of a multiplexer M via a wavelength conversion apparatus K1. Each of the other outlets A2, Ai, An of the coupler is connected to a respective inlet B2, Bi, Bn of the multiplexer M via a respective delay line L2, Li, Ln, and via a respective wavelength conversion apparatus K2, Ki, Kn. The outlet Q of the multiplexer M delivers the output signal Sx which is also in the form of a power-modulated carrier.

If an output signal of determined wavelength $\lambda x$ is desired, the outlet Q is connected to an output wavelength converter kx organized to deliver a converted output signal Sx' carried by said wavelength $\lambda x$.

In a first embodiment, each conversion apparatus, e.g. Ki comprises a wavelength converter ki coupled to an amplifying optical gate G that can be controlled by a control signal ri. Each converter ki receives a portion ai of the input wave Ex via the associated delay line Li or directly for the converter k1. The optical gates G receive from the respective converters k1, k2, ki, kn respective converted waves carried by respective wavelengths $\lambda 1, \lambda 2, \lambda i, \lambda n$. These wavelengths are those to which the respective inlets B1, B2, Bi, Bn of the multiplexer M are set.

In operation, the control signals r1, r2, ri, rn are applied selectively to the gates G of the wavelength conversion apparatuses K1, K2, Ki, Kn. When a modulated wave Ex is applied to the inlet P of the coupler C, the active gate(s) G deliver delayed waves b1, b2, bi, bn to the corresponding inlets of the multiplexer M with delays that are functions of the associated delay lines L2, Li, Ln. The multiplexer M then delivers via its outlet Q the output signal Sx which is then composed of the delayed wave(s).

Optionally, the output converter kx converts the signal Sx into a converted output signal Sx' carried by a determined wavelength λx that may be equal to or different from the wavelength λx' carrying the input signal Ex.

The conversion apparatuses and the delay lines may in principle be placed in any relative positions.

Figure 2:
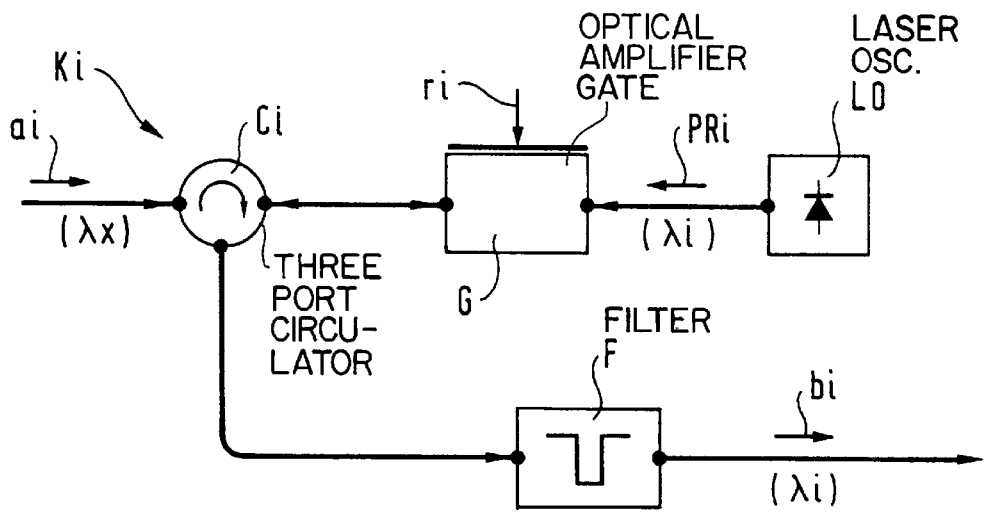
FIG. 2 shows a preferred embodiment of the wavelength conversion apparatus having an amplifying optical gate function.

The above-described wavelength conversion apparatuses use wavelength converters and separate amplifying gates. However, the two components may advantageously be replaced with the apparatus shown in FIG. 2.

In this embodiment, each conversion apparatus Ki includes a semiconductor optical amplifier G, one face of which receives a pump wave PRi delivered by a laser oscillator Lo tuned to deliver the wavelength λi. The opposite face of the amplifier is connected to a first port of a three-port circulator Ci. The circulator is disposed so as to direct the wave portion ai received from the coupler C via its second port towards the amplifier G, and to direct the wave received from the amplifier G towards a third port. When the wavelength λx of the wave portion ai is different from the wavelength λi delivered by the laser LO, the third port may be coupled to a stop filter F set to the wavelength λx. The filter F then outputs the delayed wave bi carried by the wavelength λi.

The amplifier G is dimensioned so that, when it is fed with current, it operates under saturated conditions, if the wave portion ai is at a high power level, i.e. when the input signal Ex is at its high power level.

In the embodiment shown, the wave portion ai, and the probe wave PRi injected into the amplifier have opposite propagation directions. In a variant, it is possible to apply these two waves co-directionally. However, the configuration shown provides better elimination of the wavelength λx of the delivered wave bi.

Figure 3:
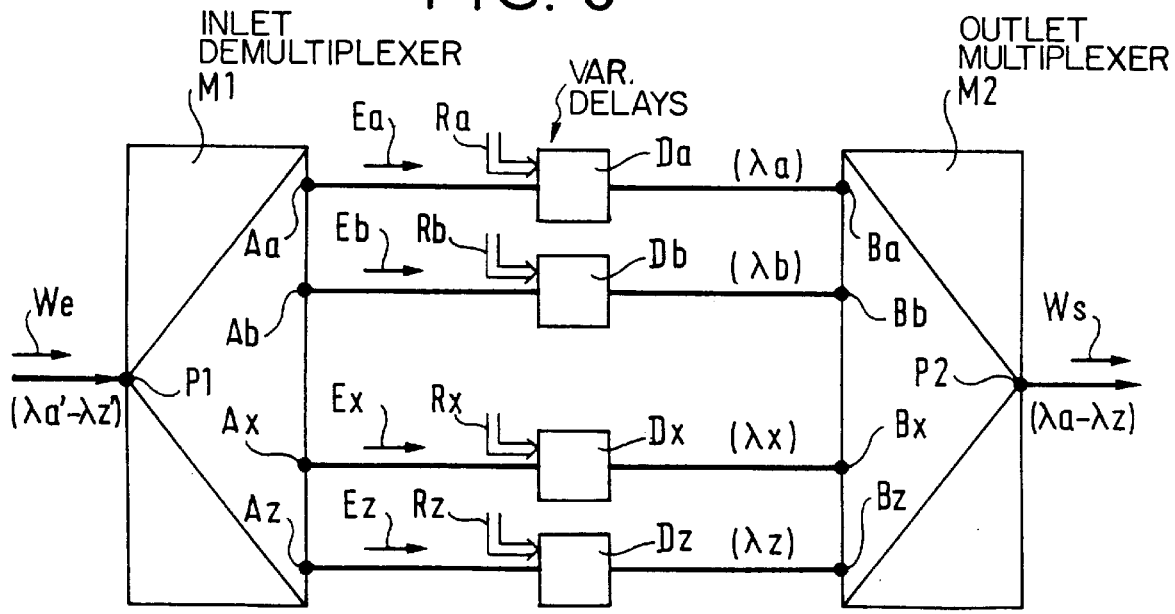
FIG. 3 shows synchronization apparatus for synchronizing the channels of a wavelength multiplex using the delay apparatus of the invention.

The above-described delay apparatus may be used advantageously to implement synchronization apparatus for synchronizing optical channels making up a wavelength multiplex. Such synchronization apparatus is shown in FIG. 3.

This apparatus includes an inlet demultiplexer M1 and an outlet multiplexer M2. The inlet demultiplexer M1 is provided with an inlet port P1, and with a plurality of outlet ports Aa, Ab, Ax, Az. The outlet multiplexer M2 is provided with an outlet port P2, and with a plurality of inlet ports Ba, Bb, Bx, Bz. The demultiplexer M1 is organized to deliver via its outlets Aa, Ab, Ax, Az the channels Ea, Eb, Ex, Ez respectively carried by the wavelengths λa', λb', λx', λz' of an input multiplex We received via the inlet port P1.

The outlets Aa, Ab, Ax, Az of the demultiplexer M1 are connected respectively to the inlets Ba, Bb, Bx, Bz of the multiplexer M2 via variable delay apparatuses Da, Db, Dx, Dz. Each of the delay apparatuses is implemented in accordance with the invention, as in the variant that includes an output converter kx. The multiplexer M2 and the delay apparatuses Da–Dz are organized so that the wavelengths λa, λb, λx, λz delivered respectively by the delay apparatuses Da, Db, Dx, Dz correspond respectively to the wavelengths allowed at the inlets Ba, Bb, Bx, Bz of the multiplexer M2.

In operation, the delay apparatuses Da, Db, Dx, Dz respectively receive the commands Ra, Rb, Rx, Rz that define the delays to be applied respectively to the corresponding channels Ea, Eb, Ex, Ez. Thus, each of the various channels Ea–Ez of the inlet multiplex We may be delayed by a respective determined value, and the multiplexer M2 outputs an output multiplex Ws made up of these selectively delayed channels.

The channels of the output multiplex Ws are carried by the wavelengths λa–λz imposed by the multiplexer M2. The wavelengths λa–λz may be identical to or different from the wavelengths λa'–λz' of the input multiplex We.

We claim:

1. Apparatus for creating a variable delay between an output optical wave and an input optical wave, the waves being modulated between low and high power levels, said apparatus comprising:
    a coupler provided with at least one inlet for receiving the input optical wave, and with n outlets for delivering portions of said input wave; and
    a multiplexer provided with at least one outlet for delivering an output optical wave, and n inlets set respectively to n associated different wavelengths, said inlets of the multiplexer being coupled respectively to the outlets of the coupler via associated wavelength conversion apparatuses, and, for at least n−1 inlets of the multiplexer, via respective delay lines all of which are different;
    and each conversion apparatus has an amplifying optical gate function for selectively delivering a converted wave modulated as a function of said input wave, and carried by a wavelength equal to that associated with said inlet.

2. Apparatus according to claim 1, wherein each wavelength conversion apparatus comprises a semiconductor optical amplifier coupled firstly to a respective one of said outlets of the coupler and secondly to a laser oscillator delivering a probe wave, said amplifier being organized to operate under saturated conditions when the input optical wave is at its high power level, said modulated converted wave being said probe wave as amplified by said amplifier.

3. Apparatus according to claim 2, wherein said probe wave and the portion of the input wave that are injected into said amplifier have opposite propagation directions.

4. Apparatus according to claim 1, including an output wavelength converter connected to the outlet of said multiplexer.

5. Apparatus for synchronizing optical channels forming a wavelength multiplex, said apparatus comprising:
    an inlet demultiplexer provided with an inlet port suitable for receiving an input multiplex formed of channels carried respectively by input wavelengths, and with a plurality of outlet ports suitable for respectively delivering said channels of said input multiplex; and
    an outlet multiplexer provided with inlet ports respectively associated with said channels and respectively set to output wavelengths;
    and each outlet port is coupled to an inlet port via a variable delay apparatus, wherein said variable delay apparatus includes
        a coupler provided with at least one inlet for receiving the input optical wave, and with n outlets for delivering portions of said input wave,
        a multiplexer provided with at least one outlet for delivering an output optical wave, and n inlets set respectively to n associated different wavelengths, said inlets of the multiplexer being coupled respectively to the outlets of the coupler via associated wavelength conversion apparatuses, and, for at least n−1 inlets of the multiplexer, via respective delay lines all of which are different,
        and each conversation apparatus has an amplifying optical gate function for selectively delivering a converted wave modulated as a function of said input wave, and carried by a wavelength equal to that associated with said inlet; and
    whose output wavelength converter delivers the wavelength that is associated with said inlet port.

* * * * *